US011191020B2

(12) United States Patent
Chen et al.

(10) Patent No.: US 11,191,020 B2
(45) Date of Patent: Nov. 30, 2021

(54) TERMINAL STATE CONVERSION METHOD AND APPARATUS

(71) Applicant: China Academy of Telecommunications Technology, Beijing (CN)

(72) Inventors: Li Chen, Beijing (CN); Chandrika Kumudinie Worrall, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/321,043

(22) PCT Filed: May 15, 2017

(86) PCT No.: PCT/CN2017/084342
§ 371 (c)(1),
(2) Date: Jan. 28, 2019

(87) PCT Pub. No.: WO2018/019001
PCT Pub. Date: Feb. 1, 2018

(65) Prior Publication Data
US 2019/0166559 A1 May 30, 2019

(30) Foreign Application Priority Data

Jul. 28, 2016 (CN) .......................... 201610615854.X

(51) Int. Cl.
*H04L 12/26* (2006.01)
*H04W 52/02* (2009.01)
(Continued)

(52) U.S. Cl.
CPC ... *H04W 52/0235* (2013.01); *H04W 52/0216* (2013.01); *H04W 52/0232* (2013.01);
(Continued)

(58) Field of Classification Search
CPC ........ H04W 52/0216; H04W 52/0232; H04W 52/0235; H04W 76/10; H04W 76/27
See application file for complete search history.

(56) References Cited

U.S. PATENT DOCUMENTS 7,965,651 B2 * 6/2011 Du .................. H04W 76/28
370/252
9,155,121 B2 * 10/2015 Rayavarapu .......... H04W 76/19
(Continued)

FOREIGN PATENT DOCUMENTS

| CN | 103338500 A | 10/2013 |
|---|---|---|
| CN | 103906123 A | 7/2014 |

(Continued)

OTHER PUBLICATIONS

Ericsson, "Comments on NR RAN functions in TR 38.801," 3GPP TSG-RAN WG3 Meeting #92 R3-161296, Nanjing, P.R. China, May 23-27, 2016, the whole document.

(Continued)

*Primary Examiner* — Phuc H Tran
(74) *Attorney, Agent, or Firm* — Kilpatrick Townsend & Stockton, LLP

(57) ABSTRACT

Disclosed are a terminal state conversion method and apparatus. A base station configures and sends a configuration policy for/to a terminal, wherein the configuration policy is a rule for determining that the terminal enters an inactive state; and a terminal in a connected state receives the configuration policy sent by the base station, and according to the configuration policy, enters the inactive state from the connected state. By means of the present invention, a terminal enters an inactive state from a connected state, and thus the terminal can perform rapid data transmission while saving power.

20 Claims, 9 Drawing Sheets

(51) Int. Cl.
*H04W 76/27* (2018.01)
*H04W 76/10* (2018.01)

(52) U.S. Cl.
CPC .......... *H04W 76/10* (2018.02); *H04W 76/27* (2018.02); *Y02D 30/70* (2020.08)

(56) References Cited

U.S. PATENT DOCUMENTS

| | | | | |
|---|---|---|---|---|
| 10,342,063 | B2* | 7/2019 | Bergquist | .............. H04W 76/28 |
| 2007/0286080 | A1* | 12/2007 | Kim | .................. H04W 52/0235 |
| | | | | 370/236 |
| 2010/0100644 | A1 | 4/2010 | Goto et al. | |
| 2010/0113023 | A1* | 5/2010 | Huang | .............. H04W 52/0216 |
| | | | | 455/436 |
| 2015/0365897 | A1 | 12/2015 | Hu et al. | |
| 2020/0022044 | A1* | 1/2020 | Kim | .................. H04W 72/1284 |

FOREIGN PATENT DOCUMENTS

| | | | | |
|---|---|---|---|---|
| EP | 2645804 | * | 10/2013 | ............ H04W 76/02 |
| EP | 2645804 | A1 | 10/2013 | |
| JP | 2015149754 | A | 8/2015 | |
| WO | 2013135287 | A1 | 9/2013 | |
| WO | 2016070936 | A1 | 5/2016 | |
| WO | 2017131046 | A1 | 8/2017 | |

OTHER PUBLICATIONS

3GPP TR 23.799 V0.6.0; 3rd Generation Partnership Project; Technical Specification Group Services and System Aspects; Study on Architecture for Next Generation System (Release 14); Jul. 2016; 320 pages.
Ericsson, "Update to the Signaling reduction for UE state transitions solution", S2-152952, SA WG2 Meeting #110-AH, Sophia-Antipolis, France, Aug. 31-Sep. 4, 2015.
Samsung, "RRC states for Next Radio", 3GPP TSG-RAN WG2 Meeting #94, R2-163486, Nanjing, China, May 23-27, 2016.
Ericsson, "Handling of inactive UEs", 3GPP TSG-RAN WG2 #94, R2-163998, Nanjing, P.R. China, May 23-27, 2016.
Catt, "Small data transmission in inactive state", 3GPP TSG-RAN WG2 Meeting #95bis, R2-166118, Kaohsiung, Oct. 10-14, 2016.
InterDigital Communications, "State Transitions for NR UE", 3GPP TSG-RAN WG2 NR, R2-1700234, Spokane, Washington, Jan. 17-19, 2017.

* cited by examiner

TERMINAL STATE CONVERSION METHOD AND APPARATUS

This application is a National Stage of International Application No. PCT/CN2017/084342, filed May 15, 2017, which claims priority to Chinese Patent Application No. 201610615854.X, filed Jul. 28, 2016, both of which are hereby incorporated by reference in their entireties.

FIELD

The present invention relates to the field of wireless communications, and particularly to a method and apparatus for switching a state of a user equipment.

BACKGROUND

As wireless communication systems are developing, there are a diversity of types of User Equipment (UE) devices and types of traffic, so power of the UE devices shall be saved, network resources shall be saved, and also demands in the various types of traffic shall be satisfied.

At present, a UE is generally communicating in a connected state and an idle state, and for example, communication states of a UE in a Long Term Evolution (LTE) system includes a Radio Resource Control (RRC)_Idle state and a RRC_Connected state.

Particularly, operations which can be performed in the RRC_Idle state include: selecting a Public Land Mobile Network (PLMN), configuring Discontinuous Reception (DRX) at a Non-Access Stratum (NAS), broadcasting system information, paging, mobility of a cell reselection scheme, allocating the UE with an identifier unique in some tracking area, storing no context information of the UE at the base station, performing transmission and reception of a sidelink communication (e.g., Device to Device (D2D) communication), and notifying and monitoring a sidelink discovery (a D2D discovery), etc.

Particularly, operations which can be performed in the RRC_Connected state include: providing the UE with an Evolved Universal Terrestrial Radio Access Network (E-UTRAN) connection, storing context information of the UE at the E-UTRAN side, being able to obtain a cell serving the UE and allocate the UE in the cell with a Cell-Radio Network Temporary Identifier (C-RNTI) at the E-UTRAN, transmitting and receiving data between the network and the UE using the C-RNTI, mobility of a network control, measuring an adjacent cell, performing sidelink communication, notifying and monitoring a sidelink discovery (a D2D discovery), and supporting following operations at a Packet Data Convergence Protocol (PDCP) layer, a Radio Link Control (RLC) layer, or a Media Access Control (MAC) layer: transmission and reception of data between the UE and the network, listening to a control signaling channel for a shared data channel to check whether there is transmission allocated for the UE over the shared data channel by the UE, reporting channel quality information and feedback information to the base station by the UE, and controlling a DRX periodicity by the base station, where the DRX periodicity is configured according to an activity level of the power-saving and the resource utilization ratio of the UE.

At present, in order to save power of the UE, and the network resource, the UE can be switched from the connected state to the idle state, and the UE cannot transmit any data in the idle state, but the UE shall transmit data rapidly while saving power of the UE in various existing types of traffic, e.g., burst small-data-packet traffic, keep-alive small-data-packet traffic, and other types of short burst traffic.

In summary, the exiting UE in the two states above cannot transmit data rapidly while saving power of the UE.

SUMMARY

An object of the invention provides a method and apparatus for switching a state of a UE so as to switch the UE between a connected state and an inactive state so that the UE can transmit data rapidly while saving power of the UE.

The object of the invention is attained in the following technical solutions.

In a first aspect, there is provided a method for switching a state of a UE, the method including: receiving, by the UE in a connected state, a configuration strategy transmitted by a base station, where the configuration strategy is a judgment rule for the UE to enter an inactive state; and entering, by the UE, the inactive state from the connected state according to the configuration strategy.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, entering, by the UE, the inactive state from the connected state according to the configuration strategy includes: determining, by the UE, whether there is subsequent uplink data transmission and downlink data transmission, and if there is no subsequent uplink data transmission and downlink data transmission, then starting, by the UE, the first timer; and determining, by the UE, whether there is subsequent uplink and downlink data transmission, at each subsequent timing unit, and if there is no subsequent uplink and downlink data transmission, then incrementing the first timer by one at each timing unit until the first timer expires, where the timing unit is a Transmission Time Interval (TTI), a sub-frame, or a preset absolute period of time; or if the UE determines that there is uplink data transmission and/or downlink data transmission at a subsequent timing unit, then stopping the first timer; and entering, by the UE, the inactive state from the connected state, upon determining that the first timer expires.

In a possible implementation, determining, by the UE, that there is no subsequent uplink data transmission includes: determining, by the UE, that there is no subsequent uplink data transmission, upon determining that an uplink data buffer is empty; or determining, by the UE, that there is no subsequent uplink data transmission, upon reception of a trigger instruction indicating that uplink traffic is completed, or uplink traffic is terminated; and determining, by the UE, that there is no subsequent downlink data transmission includes: determining, by the UE, that there is no subsequent downlink data transmission, upon reception of an indication transmitted by the base station to indicate a last downlink data packet; or determining, by the UE, that there is no subsequent downlink data transmission, upon determining that no downlink data transmission is received when a second timer expires, where the second timer is started after the UE receives downlink data transmission of the base station.

In a possible implementation, before the UE in the connected state receives the configuration strategy transmitted by the base station, the method further includes: transmitting, by the UE, a request message to the base station to request for being allowed to enter the inactive state.

In a possible implementation, after the UE enters the inactive state from the connected state according to the configuration strategy, the method further includes: transmitting, by the UE, a connection resumption request to the base station, where the connection resumption request carries an intra-area unique identifier of the UE in the inactive state; and setting up, by the UE a connection with the base station, and entering the connected state from the inactive state.

In a possible implementation, after the UE enters the inactive state from the connected state according to the configuration strategy, the method further includes: transmitting, by the UE, a data transmission request to the base station, where the data transmission request carries an intra-area unique identifier of the UE in the inactive state; and transmitting, by the UE, data with the base station in the inactive state according to a UE context stored in the inactive state of the UE.

In a possible implementation, receiving, by the UE in the connected state, the configuration strategy transmitted by the base station includes: receiving, by the UE, the configuration strategy via a connection setup command in a connection setup procedure with the base station; or receiving, by the UE, the configuration strategy via a connection reconfiguration command; or receiving, by the UE, the configuration strategy via handover signaling in a handover procedure.

In a second aspect, there is provided a method for switching a state of a UE, the method including: configuring, by a base station, the UE with a configuration strategy for the UE to enter an inactive state on its own initiative; and transmitting, by the base station, the configuration strategy to the UE.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, transmitting, by the base station, the configuration strategy to the UE includes: transmitting, by the base station, the configuration strategy via a connection setup command in a connection setup procedure; or transmitting, by the base station, the configuration strategy via a connection reconfiguration command; or transmitting, by the base station, the configuration strategy via handover signaling in a UE handover procedure.

In a possible implementation, after the base station transmits the configuration strategy to the UE, the method further includes: determining, by the base station, that the UE enters the inactive state from a connected state, according to the configuration strategy; and storing, by the base station, a UE context before the UE enters the inactive state, and releasing an air-interface unique identifier for the UE to transmit data in the connected state.

In a possible implementation, determining, by the base station, that the UE enters the inactive state from the connected state includes: starting, by the base station, a first timer for the UE to enter the inactive state, upon determining that there is no subsequent uplink data transmission and downlink data transmission of the UE; and determining, by the base station, whether there is subsequent uplink and downlink data transmission, at each subsequent timing unit, and if there is no subsequent uplink and downlink data transmission, then incrementing the first timer by one at each timing unit until the first timer expires, where the timing unit is a Transmission Time Interval (TTI), a sub-frame, or a preset absolute period of time; or if the base station determines that there is uplink data transmission and/or downlink data transmission at a subsequent timing unit, then stopping the first timer; and determining, by the base station, that the UE enters the inactive state from the connected state, upon determining that the first timer expires.

In a possible implementation, determining, by the base station, that there is no subsequent uplink data transmission of the UE includes: determining, by the base station, that there is no subsequent uplink data transmission of the UE, upon reception of an indication reported by the UE to indicate that an uplink buffer of the UE is empty; or starting, by the base station, a second timer upon determining that a last uplink data packet is received, according to a buffer reported by the UE, and determining that there is no subsequent uplink data transmission of the UE, if no uplink data transmission is received when the second timer expires; or determining, by the base station, that there is no subsequent uplink data transmission of the UE, upon reception of a trigger instruction reported by the UE to indicate that uplink traffic is completed, or uplink traffic is terminated. And determining, by the base station, that there is no subsequent downlink data transmission of the UE includes: determining, by the base station, that there is no subsequent downlink data transmission of the UE, upon determining that a downlink data buffer of the UE is empty; or determining, by the base station, that there is no subsequent downlink data transmission of the UE, upon reception of a trigger instruction indicating that downlink traffic of the UE is completed, or downlink traffic of the UE is terminated.

In a possible implementation, determining, by the base station, that the UE enters the inactive state from the connected state includes: determining, by the base station, that the UE enters the inactive state from the connected state, upon reception of a request transmitted by a target base station to obtain a context of the UE, where the target base station is a base station receiving a connection resumption request or a data transmission request, carrying an intra-area unique identifier of the UE in the inactive state, transmitted by the UE.

In a possible implementation, after the base station receives the request transmitted by the target base station to obtain the context of the UE, the method further includes: forwarding, by the base station, the context of the UE to the target base station.

In a possible implementation, determining, by the base station, that the UE enters the inactive state from the connected state includes: determining, by the base station, that the UE enters the inactive state from the connected state, upon reception of a connection resumption request or a data transmission request, carrying an intra-area unique identifier of the UE in the inactive state, transmitted by the UE.

In a possible implementation, before the base station configures the configuration strategy for the UE to enter the inactive state, the method further includes: receiving, by the base station, a request message transmitted by the UE to request for being allowed to enter the inactive state.

In a third aspect, there is provided an apparatus for switching a state of a UE, the apparatus including: a receiving unit configured to receive a configuration strategy transmitted by a base station on the UE in a connected state, where the configuration strategy is a judgment rule for the UE to enter an inactive state; and a processing unit configured to control the UE to enter the inactive state from the connected state according to the configuration strategy.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, the processing unit is configured to control the UE to enter the inactive state from the connected state according to the configuration strategy by: determining whether there is subsequent uplink data transmission and downlink data transmission, and if there is no subsequent uplink data transmission and downlink data transmission, starting the first timer; and determining whether there is subsequent uplink and downlink data transmission, at each subsequent timing unit, and if there is no subsequent uplink and downlink data transmission, incrementing the first timer by one at each timing unit until the first timer expires, where the timing unit is a Transmission Time Interval (TTI), a sub-frame, or a preset absolute period of time; or if it is determined that there is uplink data transmission and/or downlink data transmission at a subsequent timing unit, stopping the first timer; and controlling the UE to enter the inactive state from the connected state, upon determining that the first timer expires.

In a possible implementation, the processing unit is further configured to: determine that there is no subsequent uplink data transmission and downlink data transmission, before controlling the UE to enter the inactive state from the connected state according to the configuration strategy.

In a possible implementation, the processing unit is configured to determine that there is no subsequent uplink data transmission by: determining that there is no subsequent uplink data transmission, upon determining that an uplink data buffer is empty; or determining that there is no subsequent uplink data transmission, upon reception of a trigger instruction indicating that uplink traffic is completed, or uplink traffic is terminated; and the processing unit is configured to determine that there is no subsequent downlink data transmission by: determining that there is no subsequent downlink data transmission, upon reception of an indication transmitted by the base station to indicate a last downlink data packet; or determining that there is no subsequent downlink data transmission, if no downlink data transmission is received when a second timer expires, where the second timer is started after the UE receives downlink data transmission of the base station.

In a possible implementation, the apparatus further includes a transmitting unit, where the transmitting unit is configured to transmit a request message to the base station to request for being allowed to enter the inactive state, before the receiving unit receives the configuration strategy transmitted by the base station.

In a possible implementation, the apparatus further includes a transmitting unit, where the transmitting unit is configured to transmit a connection resumption request to the base station after the processing unit controls the UE to enter the inactive state from the connected state according to the configuration strategy, where the connection resumption request carries an intra-area unique identifier of the UE in the inactive state; and the processing unit is configured to set up a connection between the UE and the base station, and to control the UE to enter the connected state from the inactive state.

In a possible implementation, the apparatus further includes a transmitting unit, where the transmitting unit is configured to transmit a data transmission request to the base station after the processing unit controls the UE to enter the inactive state from the connected state according to the configuration strategy, where the data transmission request carries an intra-area unique identifier of the UE in the inactive state; and the processing unit is configured to transmit data in the inactive state according to a UE context, transmitted by the base station and stored in the inactive state of the UE.

In a possible implementation, the receiving unit is configured to receive the configuration strategy transmitted by the base station on the UE in the connected state by: receiving the configuration strategy via a connection setup command in a connection setup procedure with the base station; or receiving the configuration strategy via a connection reconfiguration command; or receiving the configuration strategy via handover signaling in a handover procedure.

In a fourth aspect, there is provided an apparatus for switching a state of a UE, the apparatus including: a processing unit configured to configure, on a base station, the UE with a configuration strategy for the UE to enter an inactive state on its own initiative; and a transmitting unit configured to transmit the configuration strategy to the UE.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, the transmitting unit is configured to transmit the configuration strategy to the UE by: transmitting the configuration strategy via a connection setup command in a connection setup procedure; or transmitting the configuration strategy via a connection reconfiguration command; or transmitting the configuration strategy via handover signaling in a UE handover procedure.

In a possible implementation, the processing unit is further configured: after the transmitting unit transmits the configuration strategy to the UE, to determine that the UE enters the inactive state from a connected state, according to the configuration strategy, to store a UE context before the UE enters the inactive state, and to release an air-interface unique identifier for the UE to transmit data in the connected state.

In a possible implementation, the processing unit is configured to determine that the UE enters the inactive state from the connected state by: starting a first timer for the UE to enter the inactive state, upon determining that there is no subsequent uplink data transmission and downlink data transmission of the UE; and determining whether there is subsequent uplink and downlink data transmission, at each subsequent timing unit, and if there is no subsequent uplink and downlink data transmission, incrementing the first timer by one at each timing unit until the first timer expires, where the timing unit is a Transmission Time Interval (TTI), a sub-frame, or a preset absolute period of time; or if there is subsequent uplink data transmission and/or downlink data transmission of the UE, stopping the first timer; and determining that the UE enters the inactive state from the connected state, upon determining that the first timer expires.

In a possible implementation, the processing unit is configured to determine that there is no subsequent uplink data transmission of the UE by: determining that there is no subsequent uplink data transmission of the UE, upon reception of an indication reported by the UE to indicate that an uplink buffer of the UE is empty; or starting a second timer upon determining that a last uplink data packet is received, according to a buffer reported by the UE, and determining that there is no subsequent uplink data transmission of the UE if no uplink data transmission is received when the second timer expires; or determining that there is no subsequent uplink data transmission of the UE, upon reception of a trigger instruction reported by the UE to indicate that uplink traffic is completed, or uplink traffic is terminated; and the processing unit is configured to determine that there is no subsequent downlink data transmission of the UE by: determining that there is no subsequent downlink data transmission of the UE, upon determining that a downlink data buffer of the UE is empty; or determining that there is no subsequent downlink data transmission of the UE, upon reception of a trigger instruction indicating that downlink traffic of the UE is completed, or downlink traffic is terminated.

In a possible implementation, the processing unit is configured to determine that the UE enters the inactive state from the connected state by: determining that the UE enters the inactive state from the connected state, upon reception of a request transmitted by a target base station to obtain a context of the UE, where the target base station is a base station receiving a connection resumption request or a data transmission request, carrying an intra-area unique identifier of the UE in the inactive state, transmitted by the UE.

In a possible implementation, the transmitting unit is further configured to: forward the context of the UE to the target base station after the processing unit receives the request transmitted by the target base station to obtain the context of the UE.

In a possible implementation, the processing unit is configured to determine that the UE enters the inactive state from the connected state by: determining that the UE enters the inactive state from the connected state, upon reception of a connection resumption request or a data transmission request, carrying an intra-area unique identifier of the UE in the inactive state, transmitted by the UE.

In a possible implementation, the apparatus further includes a receiving unit, where the receiving unit is configured to receive a request message transmitted by the UE to request for being allowed to enter the inactive state, before the processing unit configures the UE with the configuration strategy for the UE to enter the inactive state on its own initiative.

An embodiment of the invention provides an apparatus for switching a state of a UE, the apparatus including a processor, a receiver, and a memory, where the memory is configured to store program codes to be executed by the processor; and the processor is configured to invoke the program codes stored in the memory to: receive on the UE in a connected state a configuration strategy transmitted by a base station through the receiver, where the configuration strategy is a judgment rule for the UE to enter an inactive state; and control the UE to enter the inactive state from the connected state according to the configuration strategy.

An embodiment of the invention provides an apparatus for switching a state of a UE, the apparatus including a transceiver, and at least one processor connected with the transceiver, where the processor is configured to read and execute programs in a memory to: configure on a base station a configuration strategy for the UE to enter an inactive state on its own initiative, and transmit the configuration strategy to the UE through the transceiver; and the transceiver is configured to receive and transmit data under the control of the processor.

DETAILED DESCRIPTION OF THE EMBODIMENTS

Figure 1:
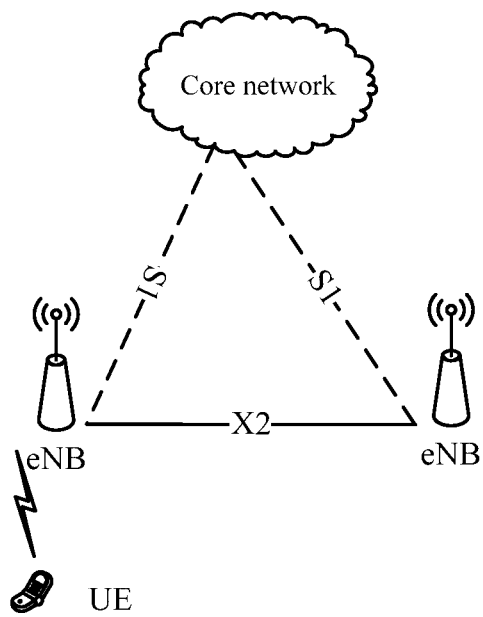
FIG. 1 is a schematic diagram of a network deployment architecture to which an embodiment of the invention is applicable.

The technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

As wireless communication systems are developing, there are a diversity of types of UE devices, and types of traffic, so power of the UE devices shall be saved, network resources shall be saved, and also demands in the various types of traffic shall be satisfied. In order to enable a UE to transmit data rapidly while saving power of the UE, a new UE state is introduced, i.e., an inactive state, and the UE in the inactive state remains connected with a core network, but does not perform any conventional operations in the air-interface connected state (e.g., a handover, updating uplink regularly, monitoring a radio link, etc.), and is not allocated with any UE identifier to be directly used for air-interface transmission (e.g., a C-RNTI), so the UE in the inactive state cannot perform any air-interface scheduling transmission directly.

Following operations are allowed in the inactive state.

The core network determines that the UE is in a connected state.

Mobility is enforced by the UE in a Radio Access Network (RAN) tracking area, preconfigured by a network side, in a cell reselection procedure instead of a handover procedure.

The UE is allocated with a unique subscriber identifier in the RAN tracking area preconfigured by the network side.

In the inactive state, the network side allocates the UE with an RAN identifier applicable in some area to identify the UE in the inactive state, and the identifier can be used for the network side to search for the UE, or for the UE to enter the connected state through identity recognition while initiating an uplink access on its own initiative. In the embodiments of the invention, the identifier can be referred to as an intra-area unique identifier of the UE in the inactive state (an inactive UE ID), or can be referred to as a resume UE ID, of course. The identifier is different from a globally unique International Mobile Subscriber Identity (IMSI), or an identifier C-RNTI of the UE in the connected state in that a length of the inactive UE ID lies between those of the IMSI and the C-RNTI (e.g., the length of the inactive UE ID is 40 bits, and a length of the C-RNTI is 16 bits), and the inactive UE ID is only applicable in some area including a plurality of cells or a plurality of base stations so that the inactive UE ID of the UE shall be updated outside the area.

At present, the UE can only be switched from the idle state to the connected state, or from the connected state to the idle state, but cannot be switched between the connected state and the inactive state.

The embodiments of the invention provide a method for switching a state of a UE so as to switch the UE between the connected state and the inactive state.

In the embodiments of the invention, a base station can configure the UE with a configuration strategy for the UE to enter the inactive state on its own initiative so that the UE can enter the inactive state according to the configuration strategy.

Firstly, a network architecture at the RAN side in an implementation environment to which the method for switching the state of the UE according to the embodiments of the invention is applicable will be described below in brief. Particularly, two possible network deployment architectures in a future mobile communication will be described.

FIG. 1 is a schematic diagram of a first network deployment architecture, and as illustrated, the illustrated architecture includes a base station and a UE, and is a typical LTE architecture. Where there are a plurality of cells served by an evolved Node B (eNB), the UE in the connected state transmits and receives data with a cell via an air interface, and the UE in the connected state is allocated with a UE identifier C-RNTI unique in the cell.

Figure 2:
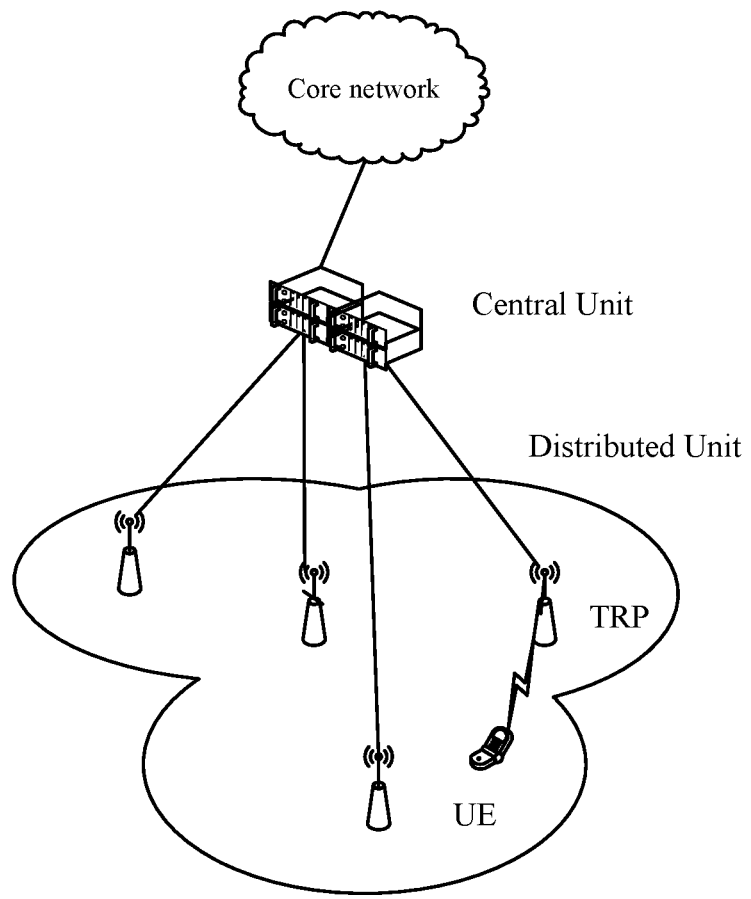
FIG. 2 is a schematic diagram of another network deployment architecture to which an embodiment of the invention is applicable.

FIG. 2 is a schematic diagram of a second network deployment architecture, and as illustrated, the illustrated architecture includes network-side nodes which include a Central Unit (CU) and a Distributed Unit (DU), and a user-side node which is a UE.

FIG. 2 is a possible architecture of future 5G mobile communication. The network-side nodes include the central unit and the distributed unit, where each central unit controls a plurality of distributed units deployed in some area, and these distributed units particularly perform air-interface transmission with a UE through a Transmission and Reception Point (TRP). One or more transmission and reception points can serve a UE concurrently to transmit data. In either of the architectures, data shall be scheduled and transmitted using a UE air-interface unique identifier allocated by the network side for the UE, and this identifier can be a C-RNTI or a TRP-RNTI.

The technical solutions according to the embodiments of the invention are at least applicable to the two RAN architectures above. For the sake of a general description later, a UE unique identifier for the UE to transmit data in the connected state will be referred to as a UE air-interface transmission unique identifier, and particularly this identifier is a C-RNTI in a traditional LTE system. A unique identifier of the UE in the inactive state in an area will be referred to as an inactive UE ID. Radio signaling and data transmitting and receiving nodes at the network side, including both the eNB in the first deployment architecture, and the CU or the DU (particularly the TRP) in the second deployment architecture will be referred collectively to as base stations.

An implementation in which a UE enters the inactive state from the connected state according to an embodiment of the invention will be described below in details.

Figure 3:
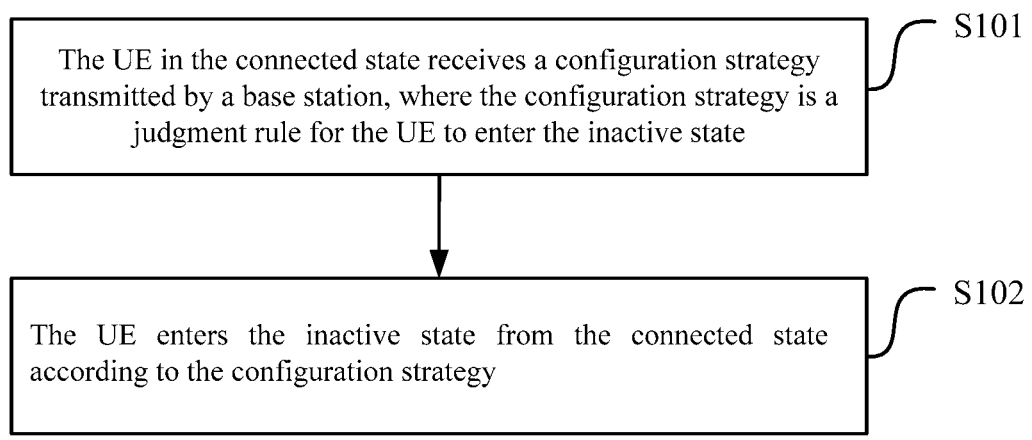
FIG. 3 is a flow chart of an implementation in which a UE enters an inactive state from a connected state according to an embodiment of the invention.

FIG. 3 is a flow chart of an implementation in which a UE enters the inactive state from the connected state according to an embodiment of the invention, and as illustrated, the flow includes the following operations.

In the operation S101, the UE in the connected state receives a configuration strategy transmitted by a base station, where the configuration strategy is a judgment rule for the UE to enter the inactive state.

In the embodiment of the invention, the configuration strategy can include an indication that the UE is allowed to enter the inactive state. The configuration strategy can include an inactive UE ID transmitted by the base station to the UE, and since the inactive UE ID is required for the UE to be in the inactive state, if the base station transmits the inactive UE ID to the UE, then it may be determined that the base station allows the UE to enter the inactive state. The configuration strategy can include a timer for the UE to be configured to enter the inactive state, and this timer can be preconfigured by the UE, or can be specified in a protocol. For the sake of a convenient description, the timer will be referred to as a first timer in the embodiment of the invention.

In a possible implementation, the UE can transmit a request message to the base station to request for being allowed to enter the inactive state so that the base station configures the UE with the configuration strategy for the UE to enter the inactive state on its own initiative, in response to the request message.

In the embodiment of the invention, the UE can receive the configuration strategy transmitted by the base station in the following implementations.

In a possible implementation, the UE receives the configuration strategy via a connection setup command in a procedure of setting up a connection with the base station.

In another possible implementation, the UE receives the configuration strategy via a connection reconfiguration command.

In still another possible implementation, the UE receives the configuration strategy via handover signaling in a handover procedure.

In the operation S102, the UE enters the inactive state from the connected state according to the configuration strategy.

In the embodiment of the invention, the UE needs to determine that there is no subsequent uplink data transmission or downlink data transmission of the UE, before entering from the connected state to the inactive state according to the configuration strategy.

Particularly, the UE can determine that there is no downlink data transmission, in one of the following instances.

A. The UE receives an indication transmitted by the base station to indicate the last downlink data packet, and determines that there is no subsequent downlink data transmission.

B. The UE does not receive any downlink data transmission when a second timer expires, and determines that there is no subsequent downlink data transmission, where the second timer is started after the UE receives downlink data transmission of the base station.

The UE can determine that there is no uplink data transmission, in one of the following instances.

A. The UE determines that there is no uplink data transmission, upon determining that an uplink data buffer is empty.

B. The UE determines that there is no uplink data transmission, upon reception of a trigger instruction indicating that uplink traffic is completed, or uplink traffic is terminated, where the trigger instruction can be triggered by an application layer in the UE, for example.

Figure 4:
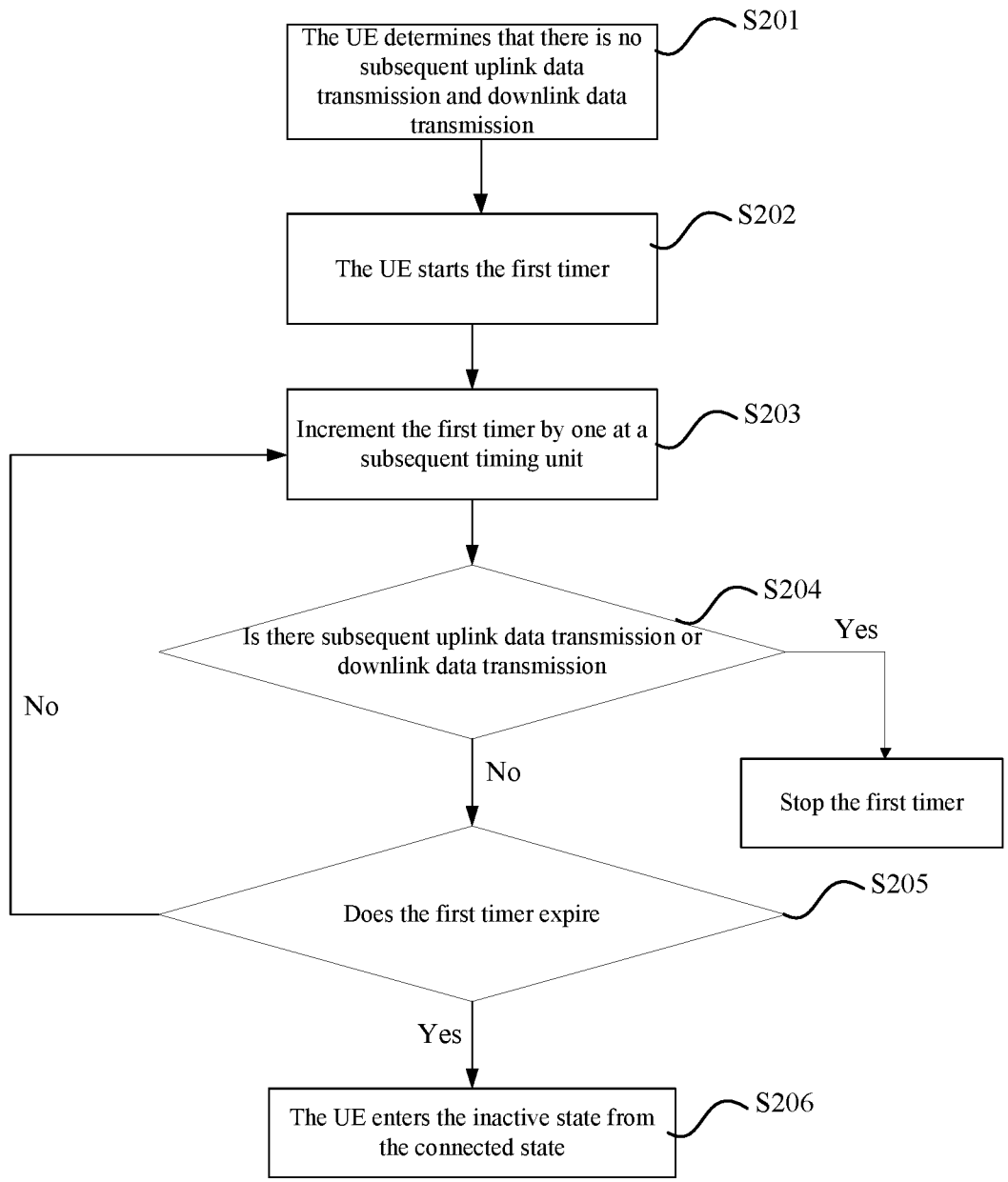
FIG. 4 is a flow chart of a possible implementation in which a UE enters an inactive state from a connected state according to an embodiment of the invention.

FIG. 4 is a flow chart of a possible implementation in which a UE enters the inactive state from the connected state according to an embodiment of the invention, and as illustrated in FIG. 4, the flow includes the following operations.

In the operation S201, the UE determines that there is no subsequent uplink data transmission and downlink data transmission, by determining whether there is subsequent uplink data transmission and downlink data transmission.

In the operation S202, the UE starts the first timer.

In the operation S203, the UE determines whether there is subsequent uplink and downlink data transmission, at each timing unit, and if there is no subsequent uplink and downlink data transmission, then the UE will increment the first timer by one at each timing unit, where the timing unit is a Transmission Time Interval (TTI), a sub-frame, or a preset absolute period of time (e.g., 0.5 ms or 1 ms).

In the operation S204, the UE determines whether there is subsequent uplink data transmission or downlink data transmission.

If there is subsequent uplink data transmission or downlink data transmission, then the UE will stop the first timer.

If there is no subsequent uplink data transmission and downlink data transmission, then the UE will continue with running the first timer.

In the operation S205, the UE determines whether the first timer expires, and if not, then the flow will return to the operation S203; otherwise, the flow will proceed to the operation S206.

In the operation S206, the UE enters the inactive state from the connected state.

In the embodiment of the invention, the UE can enter the inactive state automatically as described above.

In the embodiment of the invention, after the UE enters the inactive state from the connected state, if it needs to have its state switched again (for example, the UE needs to resume its connection, and to enter the connected state from the inactive state), or it needs to transmit data in the inactive state, then the UE may transmit a connection resumption request or a data transmission request to a target base station or an anchor base station, where the connection resumption request or the data transmission request carries an inactive UE ID of the UE in the inactive state.

In the embodiment of the invention, the UE resumes its connection, or transmits data in the inactive state, in the following several scenarios.

In a first scenario, the UE has accessed another base station (referred to as a target base station hereinafter in the embodiment of the invention), and the target base station obtains a context of the UE from a base station with which the UE was originally connected (referred to as an anchor base station hereinafter in the embodiment of the invention), and makes the UE enter the connected state or transmit data in the inactive state, as requested by the UE; and at this time, the anchor base station transmits the context of the UE to the target base station via an inter-base station interface, and optionally, the target base station reconfigures the UE in the inactive state, including an inactive UE ID.

In an implementation, if the anchor base station mistakes the UE at this time, and thus determines that the UE has not entered the inactive state, then the anchor base station will update the state of the UE to the inactive state, and release a UE unique identifier of the UE allocated by the anchor base station for transmitting data in the connected state, i.e., a UE air-interface transmission unique identifier or a C-RNTI, in addition to transmitting the context of the UE to the target base station via the inter-base station interface.

In a second scenario, the UE requests the anchor base station for resuming its connection, or transmitting data in the inactive state. If the UE requests for resuming its connection, then the anchor base station will perform a connected state resumption procedure upon determining that the UE has entered the inactive state. If the UE initiates data transmission in the inactive state at the anchor base station, then the anchor base station will initiate a data transmission procedure in the inactive state as requested by the UE.

In an implementation, if the anchor base station mistakes the UE at this time, and thus determines that the UE has not entered the inactive state, then it will update the state of the UE to the inactive state, store a context of the UE, and initiate a data transmission procedure in the inactive state.

In another implementation, after the UE enters the inactive state, if the base station has different understanding from the UE, and thus determines that the UE is still in the connected state, and initiates downlink data transmission to the UE, then after a downlink data transmission failure threshold (the transmission failure threshold refers to that a specified number of data packets have failed to be transmitted, or have not been transmitted accurately in a specified period of time) is reached, it will determine that the UE has entered the inactive state, and initiate downlink data transmission to the UE in the inactive state using the inactive UE ID and another UE context.

Moreover, if the base station determines that the UE has entered the inactive state, but the UE has not really entered it (it is still in the connected state), then since the inactive UE ID is stored in the UE, in this case, the base station will initiate an operation of the UE in the inactive state, e.g., to resume its connection or to transmit data, and the UE will determine that it has different understanding from the base station, according to an instruction of the base station (e.g., paging), and operate in the inactive state as instructed by the base station. However this abnormal state generally can be avoided, and in short, the base station can delay the starting of a timer for the UE to enter the inactive state, or a length of time of the timer can be extended from a operating length of time of the UE.

Figure 5:
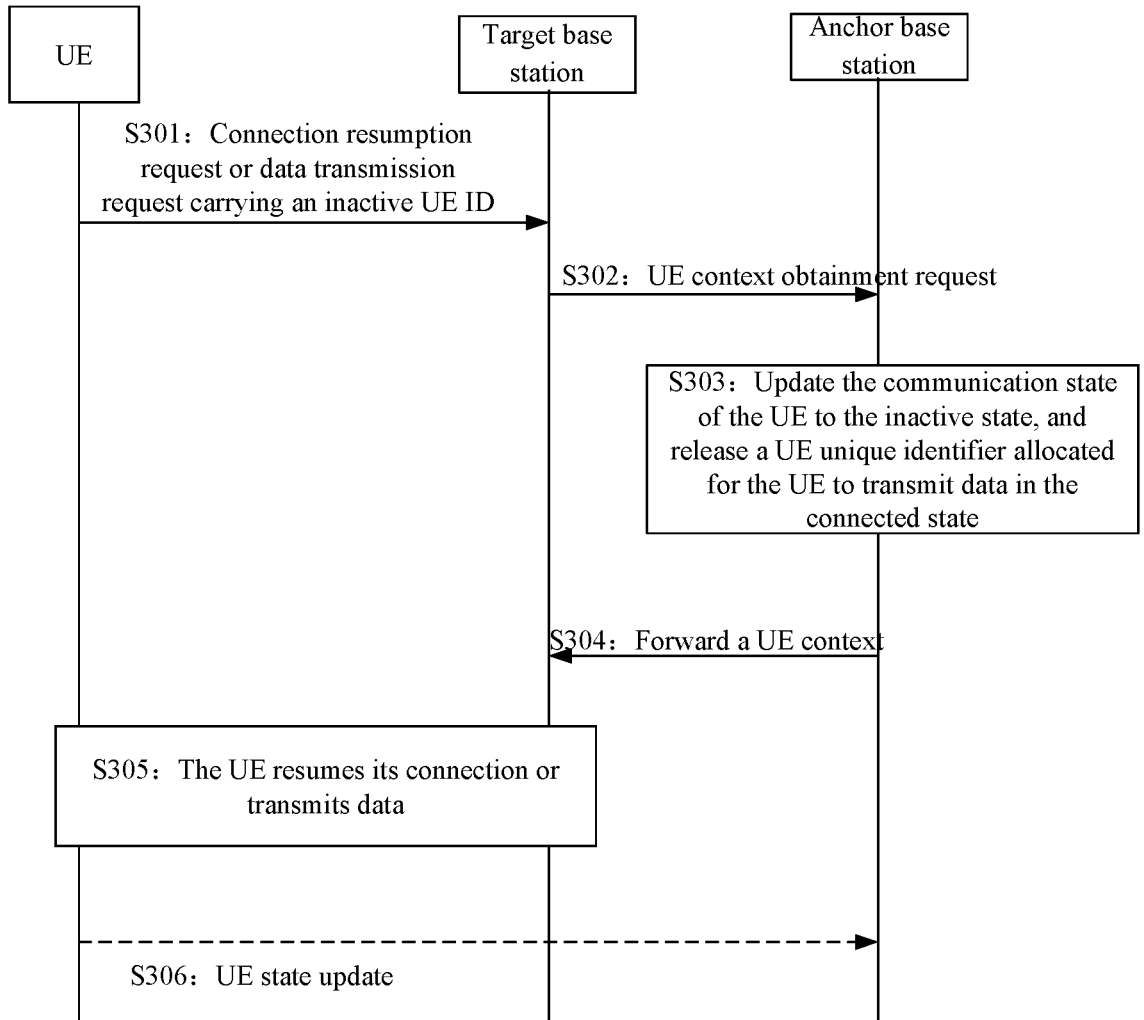
FIG. 5 is a flow chart of an implementation in which a UE in an inactive state resumes its connection at a target base station, or the UE transmits data in the inactive state, according to an embodiment of the invention.

FIG. 5 is a flow chart of an implementation in which a UE in the inactive state resumes its connection at a target base station, or the UE transmits data in the inactive state, according to an embodiment of the invention. As illustrated, the flow includes the following operations.

In the operation S301, the UE initiates a connection resumption request or a data transmission request to a base station (a target base station), where the connection resumption request or the data transmission request caries an inactive UE ID.

In the operation S302, the target base station transmits a UE context obtainment request to an anchor base station.

In the operation S303, the anchor base station determines that the UE is in the inactive state, upon reception of the UE context obtainment request of the target base station, and then updates the state of the UE to the inactive state, and releases a UE unique identifier allocated for the UE to transmit data in the connected state, i.e., a UE air-interface transmission unique identifier or a C-RNTI.

In the operation S304, the anchor base station forwards the context of the UE to the target base station, and can delete the context of the UE. The anchor base station of the UE is updated to the current target base station.

In the operation S305, the base station (the target base station) and the UE perform a UE connection resumption or data transmission procedure according to the context of the UE.

In the operation S306, if the UE resumes its connection at the target base station, but the anchor base station is not updated and still be the original anchor base station, so the original anchor base station still stores the context of the UE, then a UE state update will be further transmitted to notify the anchor base station.

An implementation in which the base station controls the UE to enter the inactive state from the connected state according to an embodiment of the invention will be described below in details.

Figure 6:
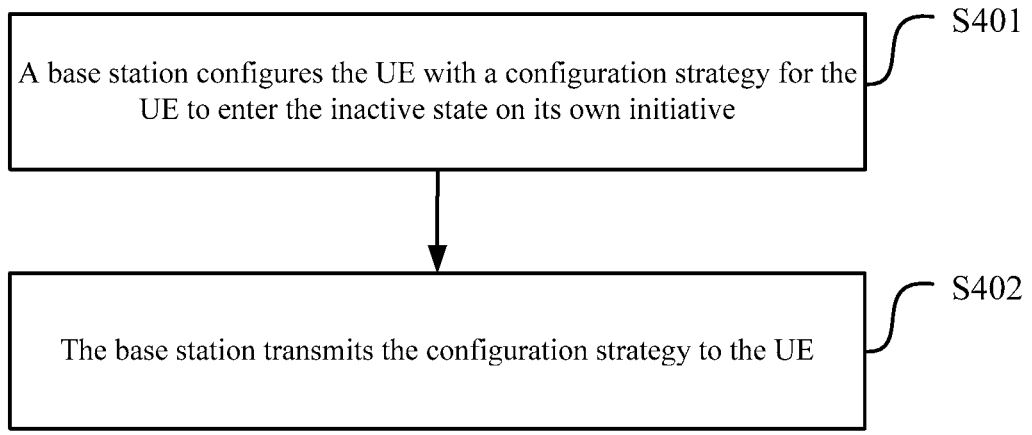
FIG. 6 is a flow chart of an implementation in which a base station side controls a UE to enter an inactive state from a connected state according to an embodiment of the invention.

FIG. 6 is a flow chart of an implementation in which the base station side controls a UE to enter the inactive state from the connected state according to an embodiment of the invention, and as illustrated in FIG. 6, the flow includes the following operations.

In the operation S401, a base station configures the UE with a configuration strategy for the UE to enter the inactive state on its own initiative.

In the embodiment of the invention, the configuration strategy configured by the base station for the UE to enter the inactive state on its own initiative can include an indication that the UE is allowed to enter the inactive state, and can also include an intra-area unique identifier of the UE in the inactive state, and can further include a first timer for the UE to enter the inactive state.

In the embodiment of the invention, the base station can configure the UE with the configuration strategy for the UE to enter the inactive state on its own initiative, in response to a request message transmitted by the UE to request for entering the inactive state.

In the operation S402, the base station transmits the configuration strategy to the UE.

In the embodiment of the invention, the base station can transmit the configuration strategy to the UE in one or more of the following implementations.

In an implementation, the base station transmits the configuration strategy via a connection setup command in a connection setup procedure. In another implementation, the base station transmits the configuration strategy via a connection reconfiguration command. In still another implementation, the base station transmits the configuration strategy via handover signaling in a UE handover procedure.

In the embodiment of the invention, after the base station transmits the configuration strategy to the UE, in the case that the UE enters the inactive state from the connected state according to the configuration strategy, the base station can determine that the UE has entered the inactive state from the connected state, store a UE context of the UE before it enters the inactive state, and release a UE unique identifier for the UE to transmit data in the connected state, i.e., a UE air-interface transmission unique identifier or a C-RNTI.

In the embodiment of the invention, the base station can determine that the UE has entered the inactive state from the connected state, in the following several implementations.

In a first implementation, the base station determines that the UE has entered the inactive state, based upon the first timer.

Particularly, the base station starts the first timer for the UE to enter the inactive state on its own initiative, upon determining that there is subsequently no uplink data transmission and downlink data transmission of the UE. The base station determines whether there is subsequent uplink and downlink data transmission, at each subsequent timing unit, and if there is no subsequent uplink and downlink data transmission, then the base station will increment the first timer by one at each timing unit until the first timer expires, where the timing unit is a TTI, a sub-frame, or a preset absolute period of time; or if the base station determines that there is uplink data transmission and/or downlink data transmission at a subsequent timing unit, then the base station will stop the first timer. The base station determines that the UE enters the inactive state from the connected state, upon determining that the first timer expires.

Particularly, the base station can determine that there is no subsequent uplink data transmission of the UE, in one or more of the following implementations.

In an implementation, the base station determines that there is no subsequent uplink data transmission of the UE, upon reception of an indication reported by the UE to indicate that an uplink buffer of the UE is empty. In another implementation, the base station starts a second timer upon determining that the last uplink data packet is received, according to a buffer reported by the UE, and determines that there is no subsequent uplink data transmission of the UE if it does not receive any uplink data transmission when the second timer expires. In still another implementation, the base station determines that there is no subsequent uplink data transmission of the UE, upon reception of a trigger instruction reported by the UE to indicate that uplink traffic is completed, or uplink traffic is terminated, where the trigger instruction can be transmitted as a trigger instruction in the UE.

Particularly, the base station can determine that there is no subsequent downlink data transmission of the UE, in one or more of the following implementations.

In an implementation, the base station determines that there is no subsequent downlink data transmission of the UE, upon determining that a downlink data buffer of the UE is empty. In another implementation, the base station determines that there is no subsequent downlink data transmission of the UE, upon reception of a trigger instruction indicating that an downlink traffic of the UE is completed, or an downlink traffic is terminated, where the trigger instruction indicating that the downlink traffic of the UE is completed, or the downlink traffic is terminated can be signaled by a core network to the base station.

In a second implementation, the base station determines that the UE enters the inactive state from the connected state, as triggered by another base station.

The base station determines that the UE enters the inactive state from the connected state, upon reception of a request transmitted by a target base station to obtain a context of the UE, where the target base station is a base station receiving a connection resumption request or a data transmission request, including an intra-area unique identifier of the UE in the inactive state, transmitted by the UE.

Particularly, the base station can forward the context of the UE to the target base station upon reception of the request transmitted by the target base station to obtain the context of the UE, so that the target base station can perform a connection resumption procedure or a data transmission procedure with the UE.

In a third implementation, the base station determines that the UE enters the inactive state from the connected state, in response to the connection resumption request or the data transmission request of the UE.

The connection resumption request or the data transmission request transmitted by the UE carries the inactive UE ID, so the base station can determine that the UE enters the inactive state from the connected state, upon reception of the connection resumption request or the data transmission request transmitted by the UE and carrying the inactive UE ID.

Figure 7:
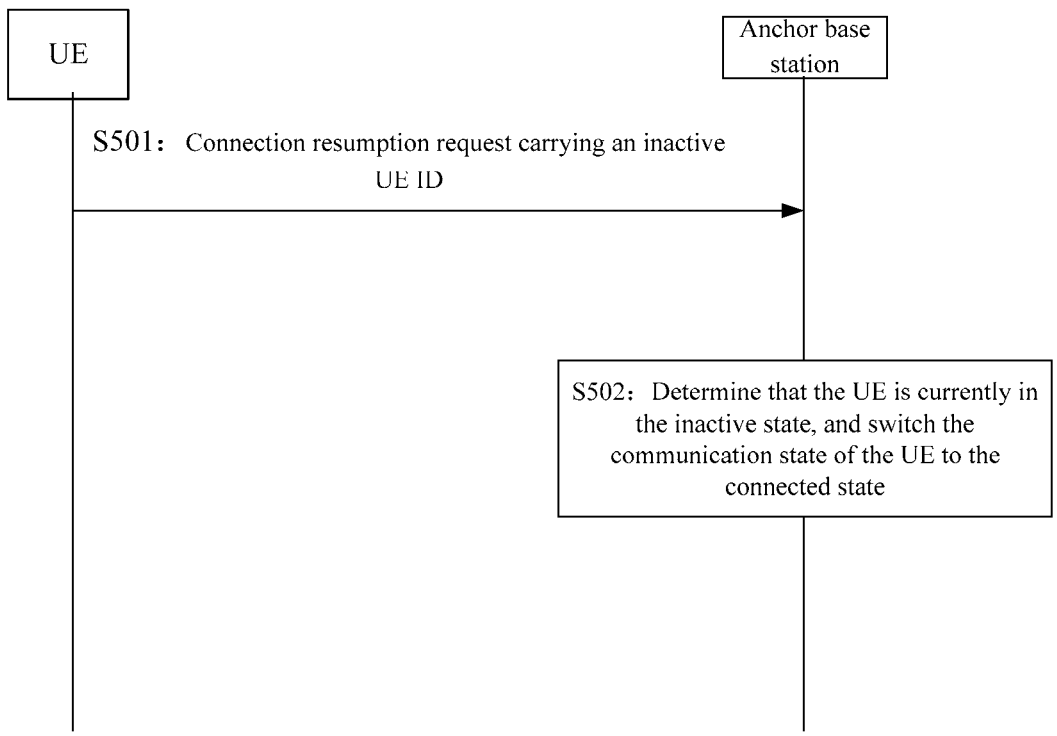
FIG. 7 is a flow chart of an implementation in which a UE in an inactive state resumes its connection at an anchor base station side according to an embodiment of the invention.

FIG. 7 is a flow chart of an implementation in which a UE in the inactive state resumes its connection (the UE enters the connected state from the inactive state) at the anchor base station side according to an embodiment of the invention, and as illustrated in FIG. 7, the flow includes the following operations.

In the operation S501, the UE transmits a connection resumption request to an anchor base station, where the connection resumption request carries an inactive UE ID.

In the operation S502, the anchor base station receives the connection resumption request carrying the inactive UE ID, and determines that the UE is currently in the inactive state, performs a subsequent connection resumption procedure, and switches the state of the UE to the connected state.

Figure 8:
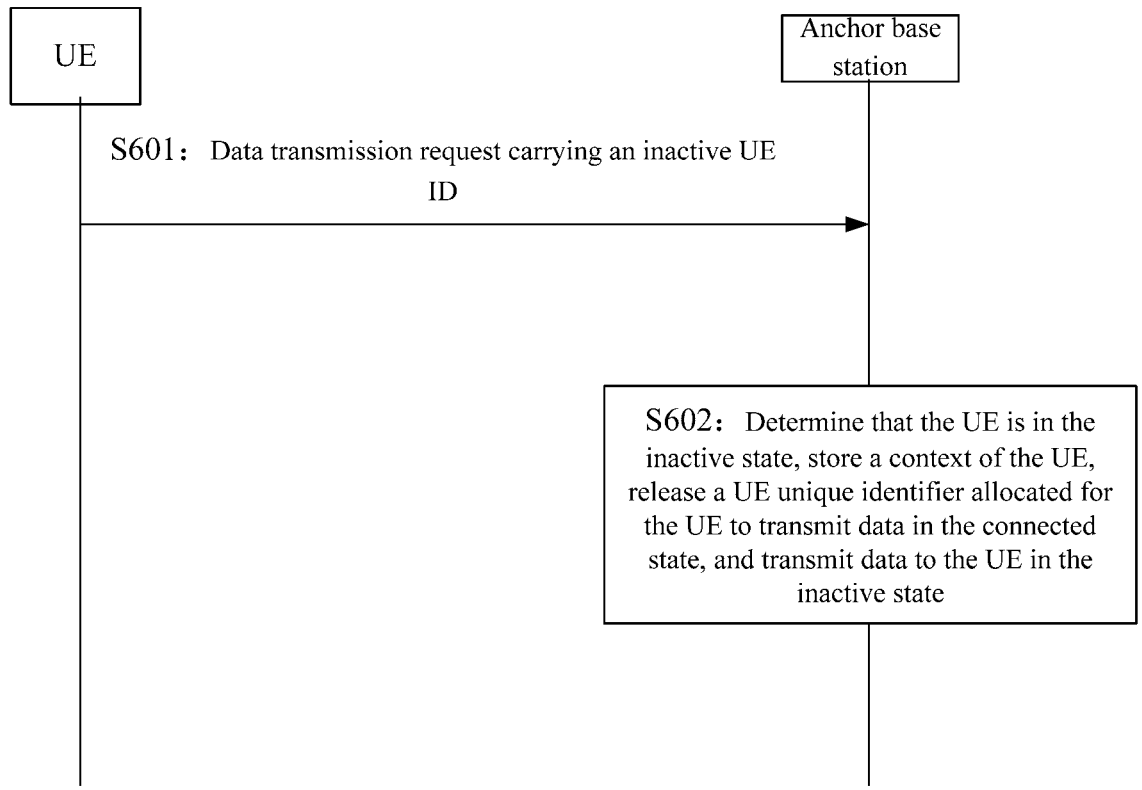
FIG. 8 is a flow chart of an implementation in which a UE in an inactive state transmits data in the inactive state at an anchor base station side according to an embodiment of the invention.

FIG. 8 is a flow chart of an implementation in which a UE in the inactive state transmits data in the inactive state at the anchor base station side according to an embodiment of the invention, and as illustrated in FIG. 8, the flow includes the following operations.

In the operation S601, the UE transmits a data transmission request to an anchor base station to transmit data in the inactive state, where the data transmission request carries an inactive UE ID.

In the operation S602, the anchor base station receives the data transmission request, determines that the UE is currently in the inactive state, stores a context of the UE, releases a UE unique identifier allocated for the UE to transmit data in the connected state, i.e., a UE air-interface transmission unique identifier or a C-RNTI, and transmits data to the UE in the inactive state.

Based upon the same inventive idea, an embodiment of the invention further provides an apparatus for switching a state of a UE, and since the apparatus addresses the problem under a similar principle to the functional method performed by the UE in the method for switching a state of a UE as illustrated in FIG. 3 to FIG. 5, reference can be made to the implementation of the method for an implementation of the apparatus, and a repeated description thereof will be omitted here.

Figure 9:
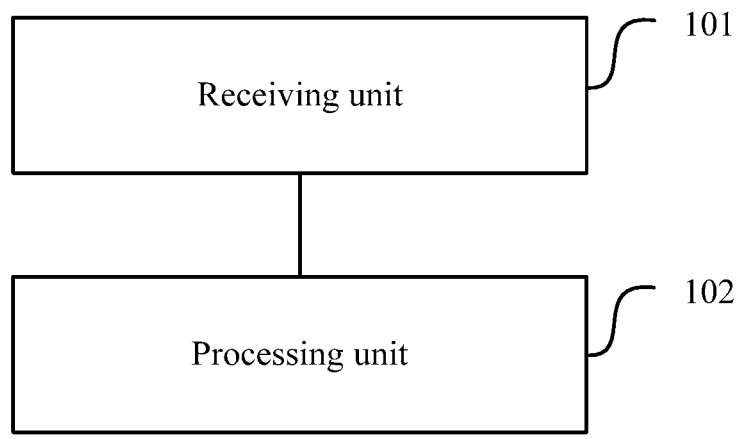
FIG. 9 is a schematic structural diagram of an apparatus for switching a state of a UE according to an embodiment of the invention.

In an embodiment as illustrated in FIG. 9, there is provided an apparatus for switching a state of a UE, and the switching apparatus includes: a receiving unit 101 configured to receive a configuration strategy transmitted by a base station on the UE in a connected state, where the configuration strategy is a judgment rule for the UE to enter an inactive state; and a processing unit 102 configured to cause the UE to enter the inactive state from the connected state according to the configuration strategy.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, the processing unit 102 is configured to cause the UE to enter the inactive state from the connected state according to the configuration strategy by: determining whether there is subsequent uplink data transmission and downlink data transmission, and if there is no subsequent uplink data transmission and downlink data transmission, starting the first timer for the UE; and determining whether there is subsequent uplink and downlink data transmission, at each subsequent timing unit, and if there is no subsequent uplink and downlink data transmission, incrementing the first timer by one at each timing unit until the first timer expires, where the timing unit is a Transmission Time Interval (TTI), a sub-frame, or a preset absolute period of time; or if it is determined that there is uplink data transmission and/or downlink data transmission at a subsequent timing unit, stopping the first timer; and causing the UE to enter the inactive state from the connected state, upon determining that the first timer expires.

In a possible implementation, the processing unit 102 is further configured to: determine that there is no subsequent uplink data transmission and downlink data transmission, before the UE enters the inactive state from the connected state according to the configuration strategy.

In a possible implementation, the processing unit 102 is configured to determine that there is no subsequent uplink data transmission by: determining that there is no subsequent uplink data transmission, upon determining that an uplink data buffer is empty; or determining that there is no subsequent uplink data transmission, upon reception of a trigger instruction indicating that uplink traffic is completed, or uplink traffic is terminated.

In a possible implementation, the processing unit 102 is configured to determine that there is no subsequent downlink data transmission by: determining that there is no subsequent downlink data transmission, upon reception of an indication transmitted by the base station to indicate a last downlink data packet; or determining that there is no subsequent downlink data transmission, when no downlink data transmission is received when a second timer expires, where the second timer is started after the UE receives downlink data transmission of the base station.

Figure 10:
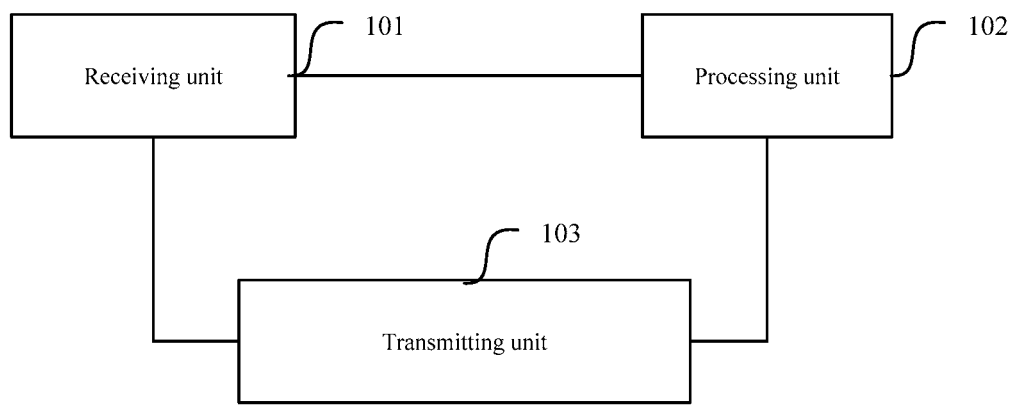
FIG. 10 is another schematic structural diagram of the apparatus for switching the state of the UE according to the embodiment of the invention.

The apparatus for switching the state of the UE further includes a transmitting unit 103 as illustrated in FIG. 10, where: the transmitting unit 103 is configured to transmit a request message to the base station to request for being allowed to enter the inactive state, before the receiving unit 101 receives the configuration strategy transmitted by the base station.

In a possible implementation, the transmitting unit 103 is configured to transmit a connection resumption request to the base station after the processing unit 102 causes the UE to enter the inactive state from the connected state according to the configuration strategy, where the connection resumption request carries an intra-area unique identifier of the UE in the inactive state; and the processing unit 102 is configured to set up a connection between the UE and the base station, and to cause the UE to enter the connected state from the inactive state.

In a possible implementation, the transmitting unit 103 is configured to transmit a data transmission request to the base station after the processing unit 102 causes the UE to enter the inactive state from the connected state according to the configuration strategy, where the data transmission request carries an intra-area unique identifier of the UE in the inactive state; and the processing unit 102 is configured to transmit data in the inactive state according to a UE context, transmitted by the base station, stored in the inactive state of the UE.

In a possible implementation, the receiving unit 101 is configured to receive the configuration strategy transmitted by the base station on the UE in the connected state by: receiving the configuration strategy via a connection setup command in a connection setup procedure; or receiving the configuration strategy via a connection reconfiguration command; or receiving the configuration strategy via handover signaling in a handover procedure.

In a particular implementation, the apparatus for switching the state of the UE can be a UE, and a hardware structure of, and a processing flow in the apparatus for switching the state of a UE according to the embodiment of the invention will be described below in the embodiment of the invention by way of an example in which the apparatus for switching the state of a UE is a UE.

Figure 11:
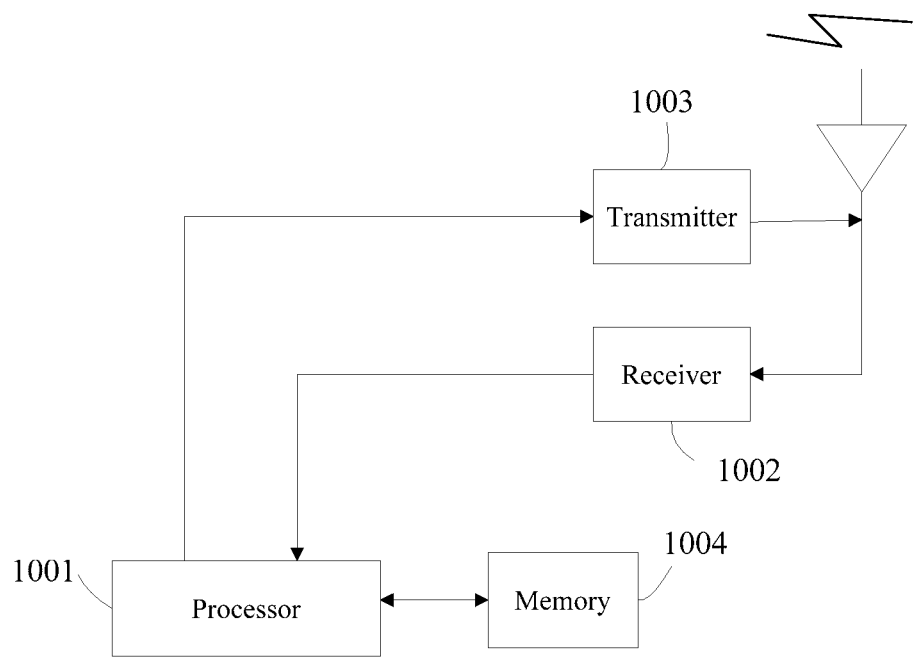
FIG. 11 is still another schematic structural diagram of the apparatus for switching the state of the UE according to the embodiment of the invention.

In an example as illustrated in FIG. 11, the apparatus for switching the state of a UE includes a processor 1001, a receiver 1002, a transmitter 1003, and a memory 1004, where the memory 1004 is configured to store program codes to be executed by the processor 1001; and the processor 1001 is configured to invoke the program codes stored in the memory 1004 to: receive a configuration strategy transmitted by a base station on the UE in a connected state through the receiver 1002, where the configuration strategy is a judgment rule for the UE to enter an inactive state; and cause the UE to enter the inactive state from the connected state according to the configuration strategy.

In the embodiment of the invention, the processor 1001 is configured to invoke the program codes stored in the memory 1004 so that: in a possible implementation, the configuration strategy includes an indication that the UE is allowed to enter the inactive state; in a possible implementation, the configuration strategy includes an intra-area unique identifier of the UE in the inactive state; in a possible implementation, the configuration strategy includes a first timer for the UE to enter the inactive state.

In a possible implementation, the processor 1001 is configured to cause the UE to enter the inactive state from the connected state according to the configuration strategy by: determining whether there is subsequent uplink data transmission and downlink data transmission, and if there is no subsequent uplink data transmission and downlink data transmission, starting the first timer for the UE; and determining whether there is subsequent uplink and downlink data transmission, at each subsequent timing unit, and if there is no subsequent uplink and downlink data transmission, incrementing the first timer by one at each timing unit until the first timer expires, where the timing unit is a Transmission Time Interval (TTI), a sub-frame, or a preset absolute period of time; or if it is determined that there is uplink data transmission and/or downlink data transmission at a subsequent timing unit, stopping the first timer; and causing the UE to enter the inactive state from the connected state, upon determining that the first timer expires.

In a possible implementation, the processor 1001 is further configured to determine that there is no subsequent uplink data transmission and downlink data transmission, before the UE enters the inactive state from the connected state according to the configuration strategy.

In a possible implementation, the processor 1001 is configured to determine that there is no subsequent uplink data transmission by: determining that there is no subsequent uplink data transmission, upon determining that an uplink data buffer is empty; or determining that there is no subsequent uplink data transmission, upon reception of a trigger instruction indicating that uplink traffic is completed, or uplink traffic is terminated.

In a possible implementation, the processor 1001 is configured to determine that there is no subsequent downlink data transmission by: determining that there is no subsequent downlink data transmission, upon reception of an indication transmitted by the base station to indicate a last downlink data packet; or determining that there is no subsequent downlink data transmission, when no downlink data transmission is received when a second timer expires, where the second timer is started after the UE receives downlink data transmission of the base station.

The transmitter 1003 is configured to transmit a request message to the base station to request for being allowed to enter the inactive state, before the receiver 1002 receives the configuration strategy transmitted by the base station.

In a possible implementation, the transmitter 1003 is configured to transmit a connection resumption request to the base station after the processor 1001 causes the UE to enter the inactive state from the connected state according to the configuration strategy, where the connection resumption request carries an intra-area unique identifier of the UE in the inactive state; and the processor 1001 is configured to set up a connection between the UE and the base station, and to cause the UE to enter the connected state from the inactive state.

In a possible implementation, the transmitter 1003 is configured to transmit a data transmission request to the base station after the processor 1001 causes the UE to enter the inactive state from the connected state according to the configuration strategy, where the data transmission request carries an intra-area unique identifier of the UE in the inactive state; and the processor 1001 is configured to transmit data in the inactive state according to a UE context, transmitted by the base station, stored in the inactive state of the UE.

In a possible implementation, the receiver 1002 is configured to receive the configuration strategy transmitted by the base station on the UE in the connected state by: receiving the configuration strategy via a connection setup command in a connection setup procedure; or receiving the configuration strategy via a connection reconfiguration command; or receiving the configuration strategy via handover signaling in a handover procedure.

Based upon the same inventive idea, an embodiment of the invention further provides an apparatus for switching a state of a UE, and since the apparatus addresses the problem under a similar principle to the functional method performed by the UE in the method for switching a state of a UE as illustrated in FIG. 6 to FIG. 8, reference can be made to the implementation of the method for an implementation of the apparatus, and a repeated description thereof will be omitted here.

Figure 12:
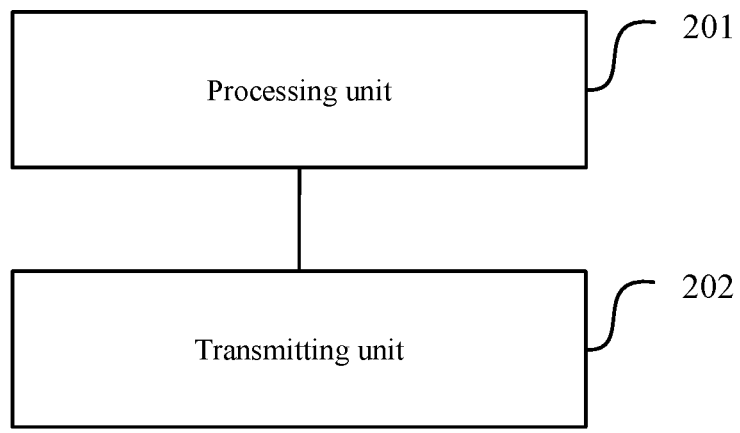
FIG. 12 is a schematic structural diagram of another apparatus for switching a state of a UE according to an embodiment of the invention.

In an embodiment as illustrated in FIG. 12, there is provided an apparatus for switching a state of a UE, and the switching apparatus includes a processing unit 201 and a transmitting unit 202, where: the processing unit 201 is configured to configure the UE with a configuration strategy for the UE to enter an inactive state on its own initiative; and the transmitting unit 202 is configured to transmit the configuration strategy to the UE.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, the transmitting unit 202 is configured to transmit the configuration strategy to the UE by: transmitting the configuration strategy via a connection setup command in a connection setup procedure; or transmitting the configuration strategy via a connection reconfiguration command; or transmitting the configuration strategy via handover signaling in a UE handover procedure.

In a possible implementation, the processing unit 201 is further configured: after the transmitting unit 202 transmits the configuration strategy to the UE, to determine that the UE enters the inactive state from a connected state, according to the configuration strategy, to store a UE context before the UE enters the inactive state, and to release an air-interface unique identifier for the UE to transmit data in the connected state.

In a possible implementation, the processing unit 201 is configured to determine that the UE enters the inactive state from the connected state by: starting a first timer for the UE to enter the inactive state, upon determining that there is no subsequent uplink data transmission and downlink data transmission of the UE; and determining whether there is subsequent uplink and downlink data transmission, at each subsequent timing unit, and if there is no subsequent uplink and downlink data transmission, incrementing the first timer by one at each timing unit until the first timer expires, where the timing unit is a Transmission Time Interval (TTI), a sub-frame, or a preset absolute period of time; or if there is subsequent uplink data transmission and/or downlink data transmission of the UE, stopping the first timer; and determining that the UE enters the inactive state from the connected state, upon determining that the first timer expires.

In a possible implementation, the processing unit 201 is configured to determine that there is no subsequent uplink data transmission of the UE by: determining that there is no subsequent uplink data transmission of the UE, upon reception of an indication reported by the UE to indicate that an uplink buffer of the UE is empty; or starting a second timer upon determining that a last uplink data packet is received, according to a buffer reported by the UE, and determining that there is no subsequent uplink data transmission of the UE when no uplink data transmission is received when the second timer expires; or determining that there is no subsequent uplink data transmission of the UE, upon reception of a trigger instruction reported by the UE to indicate that uplink traffic is completed, or uplink traffic is terminated.

In a possible implementation, the processing unit 201 is configured to determine that there is no subsequent downlink data transmission of the UE by: determining that there is no subsequent downlink data transmission of the UE, upon determining that a downlink data buffer of the UE is empty; or determining that there is no subsequent downlink data transmission of the UE, upon reception of a trigger instruction indicating that downlink traffic of the UE is completed, or downlink traffic is terminated.

In a possible implementation, the processing unit 201 is configured to determine that the UE enters the inactive state from the connected state by: determining that the UE enters the inactive state from the connected state, upon reception of a request transmitted by a target base station to obtain a context of the UE, where the target base station is a base station receiving a connection resumption request or a data transmission request, transmitted by the UE, and including an intra-area unique identifier of the UE in the inactive state.

In a possible implementation, the transmitting unit 202 is further configured to forward the context of the UE to the target base station after the processing unit 201 receives the request transmitted by the target base station to obtain the context of the UE.

In a possible implementation, the processing unit 201 is configured to determine that the UE enters the inactive state from the connected state by: determining that the UE enters the inactive state from the connected state, upon reception of a connection resumption request or a data transmission request, transmitted by the UE, and including an intra-area unique identifier of the UE in the inactive state.

Figure 13:
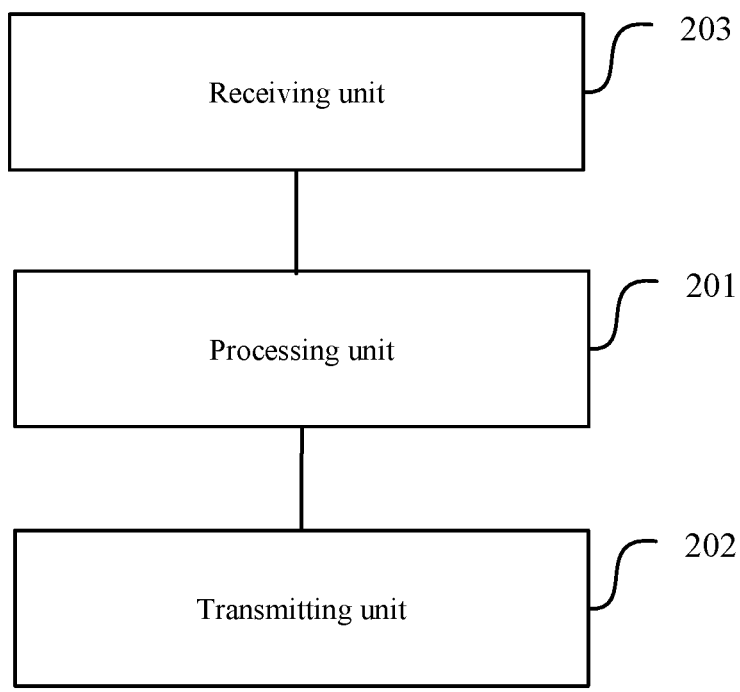
FIG. 13 is another schematic structural diagram of the other apparatus for switching the state of the UE according to the embodiment of the invention.

The apparatus for switching the state of the UE further includes a receiving unit 203 as illustrated in FIG. 13, where the receiving unit 203 is configured to receive a request message transmitted by the UE to request for being allowed to enter the inactive state, before the processing unit 201 configures the UE with the configuration strategy for the UE to enter the inactive state on its own initiative.

Figure 14:
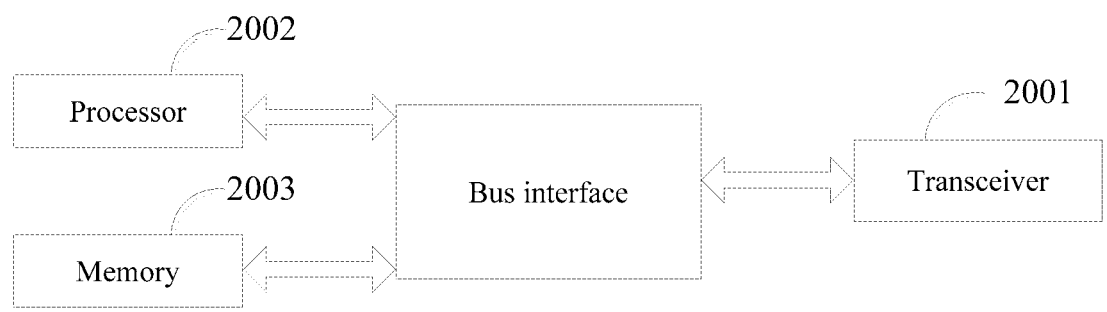
FIG. 14 is still another schematic structural diagram of the other apparatus for switching the state of the UE according to the embodiment of the invention.

In an embodiment as illustrated in FIG. 14, a hardware structure of, and a processing flow in the apparatus for switching a state of a UE according to the embodiment of the invention will be described by way of an example in which the apparatus for switching the state of a UE is a base station. The apparatus for switching the state of the UE includes a transceiver 2001, and at least one processor 2002 connected with the transceiver 2001, where the processor 2002 is configured to read and execute programs in the memory 2003 to: configure on a base station a configuration strategy for the UE to enter an inactive state on its own initiative, and transmit the configuration strategy to the UE through the transceiver 2001; and the transceiver 2001 is configured to receive and transmit data under the control of the processor 2002.

Here in FIG. 14, the bus architecture can include any number of interconnecting buses and bridges to particularly link together various circuits including one or more processors represented by the processor 2002, and one or more memories represented by the memory 2003. The bus architecture can further link together various other circuits, e.g., a peripheral device, a manostat, a power management circuit, etc., all of which are well known in the art, so a further description thereof will be omitted in this context. The bus interface serves as an interface. The transceiver 2001 can be a number of elements, e.g., a transmitter and a receiver, which are units for communication with various other devices over a transmission medium.

The processor 2002 is responsible for managing the bus architecture and performing normal processes, and the memory 2003 can store data for use by the processor 2002 in performing the operations.

In a possible implementation, the configuration strategy includes an indication that the UE is allowed to enter the inactive state.

In a possible implementation, the configuration strategy includes an intra-area unique identifier of the UE in the inactive state.

In a possible implementation, the configuration strategy includes a first timer for the UE to enter the inactive state.

In a possible implementation, the processor 2002 is configured to transmit the configuration strategy to the UE through the transceiver 2001 by: transmitting the configuration strategy via a connection setup command in a connection setup procedure; or transmitting the configuration strategy via a connection reconfiguration command; or transmitting the configuration strategy via handover signaling in a UE handover procedure.

In a possible implementation, the processor 2002 is further configured: after the configuration strategy is transmitted to the UE through the transceiver 2001, to determine that the UE enters the inactive state from the connected state, according to the configuration strategy, to store a UE context before the UE enters the inactive state, and to release an air-interface unique identifier for the UE to transmit data in the connected state.

In a possible implementation, the processor 2002 is configured to determine that the UE enters the inactive state from the connected state by: starting a first timer for the UE to enter the inactive state, upon determining that there is no subsequent uplink data transmission and downlink data transmission of the UE; and determining whether there is subsequent uplink and downlink data transmission, at each subsequent timing unit, and if there is no subsequent uplink and downlink data transmission, incrementing the first timer by one at each timing unit until the first timer expires, where the timing unit is a Transmission Time Interval (TTI), a sub-frame, or a preset absolute period of time; or if there is subsequent uplink data transmission and/or downlink data transmission of the UE, stopping the first timer; and determining that the UE enters the inactive state from the connected state, upon determining that the first timer expires.

In a possible implementation, the processor 2002 is configured to determine that there is no subsequent uplink data transmission of the UE by: determining that there is no subsequent uplink data transmission of the UE, upon reception of an indication reported by the UE to indicate that an uplink buffer of the UE is empty; or starting a second timer upon determining that a last uplink data packet is received, according to a buffer reported by the UE, and determining that there is no subsequent uplink data transmission of the UE if no uplink data transmission is received when the second timer expires; or determining that there is no subsequent uplink data transmission of the UE, upon reception of a trigger instruction reported by the UE to indicate that uplink traffic is completed, or uplink traffic is terminated.

In a possible implementation, the processor 2002 is configured to determine that there is no subsequent downlink data transmission of the UE by: determining that there is no subsequent downlink data transmission of the UE, upon determining that a downlink data buffer of the UE is empty; or determining that there is no subsequent downlink data transmission of the UE, upon reception of a trigger instruction indicating that downlink traffic of the UE is completed, or downlink traffic is terminated.

In a possible implementation, the processor 2002 is configured to determine that the UE enters the inactive state from the connected state by: determining that the UE enters the inactive state from the connected state, upon reception of a request transmitted by a target base station to obtain a context of the UE, where the target base station is a base station receiving a connection resumption request or a data transmission request, transmitted by the UE, and including an intra-area unique identifier of the UE in the inactive state.

In a possible implementation, the processor 2002 is further configured to forward the context of the UE to the target base station through the transceiver 2001 after the processor 2002 receives the request transmitted by the target base station to obtain the context of the UE.

In a possible implementation, the processor 2002 is configured to determine that the UE enters the inactive state from the connected state by: determining that the UE enters the inactive state from the connected state, upon reception of a connection resumption request or a data transmission request, transmitted by the UE, and including an intra-area unique identifier of the UE in the inactive state.

The processor 2002 is further configured to receive a request message transmitted by the UE to request for being allowed to enter the inactive state, through the transceiver 2001, before the processor 2002 configures the configuration strategy for the UE to enter the inactive state on its own initiative.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for switching a state of a User Equipment (UE), the method comprising:
receiving, by the UE in a connected state, a configuration strategy transmitted by a base station, wherein the configuration strategy is a judgment rule for the UE to enter an inactive state; and
entering, by the UE, the inactive state from the connected state on its own initiative according to the configuration strategy, when determining a condition for entering the inactive state is met;
wherein the inactive state is a state in which the UE remains connected with a core network, but the UE does not perform any conventional operations in an air-interface connected state and is not allocated with any UE identifier to be directly used for air-interface transmission;
wherein the configuration strategy comprises an intra-area unique identifier of the UE in the inactive state;
wherein the intra-area unique identifier of the UE in the inactive state is different from an International Mobile Subscriber Identity (IMSI) and a Cell-Radio Network Temporary Identifier (C-RNTI).

2. The method according to claim 1, wherein the configuration strategy further comprises at least one of an indication that the UE is allowed to enter the inactive state, or a first timer for the UE to enter the inactive state.

3. The method according to claim 1, wherein when the configuration strategy comprises the first timer for the UE to enter the inactive state; entering, by the UE, the inactive state from the connected state on its own initiative according to the configuration strategy, when determining a condition for entering the inactive state is met comprises:
determining, by the UE, whether there is subsequent uplink data transmission and downlink data transmission, and if there is no subsequent uplink data transmission and downlink data transmission, then starting, by the UE, the first timer; and
determining, by the UE, whether there is subsequent uplink and downlink data transmission, at each subsequent timing unit, and
if there is no subsequent uplink and downlink data transmission, then incrementing the first timer by one at each timing unit until the first timer expires, wherein the timing unit is a Transmission Time Interval (TTI), a sub-frame, or a preset absolute period of time; or
if the UE determines that there is uplink data transmission and/or downlink data transmission at a subsequent timing unit, then stopping the first timer; and
entering, by the UE, the inactive state from the connected state, upon determining that the first timer expires.

4. The method according to claim 3, wherein determining, by the UE, that there is no subsequent uplink data transmission comprises:
determining, by the UE, that there is no subsequent uplink data transmission, upon determining that an uplink data buffer is empty; or
determining, by the UE, that there is no subsequent uplink data transmission, upon reception of a trigger instruction indicating that uplink traffic is completed, or uplink traffic is terminated; and
determining, by the UE, that there is no subsequent downlink data transmission comprises:
determining, by the UE, that there is no subsequent downlink data transmission, upon reception of an indication transmitted by the base station to indicate a last downlink data packet; or
determining, by the UE, that there is no subsequent downlink data transmission, upon determining that no downlink data transmission is received when a second timer expires, wherein the second timer is started after the UE receives downlink data transmission of the base station.

5. The method according to claim 1, wherein before the UE in the connected state receives the configuration strategy transmitted by the base station, the method further comprises:
transmitting, by the UE, a request message to the base station to request for being allowed to enter the inactive state.

6. The method according to claim 1, wherein after the UE enters the inactive state from the connected state on its own initiative according to the configuration strategy, the method further comprises:
transmitting, by the UE, a connection resumption request to the base station, wherein the connection resumption request carries an intra-area unique identifier of the UE in the inactive state; and
setting up, by the UE a connection with the base station, and entering the connected state from the inactive state; or,
transmitting, by the UE, a data transmission request to the base station, wherein the data transmission request carries an intra-area unique identifier of the UE in the inactive state; and
transmitting, by the UE, data with the base station in the inactive state according to a UE context stored in the inactive state of the UE.

7. The method according to claim 1, wherein receiving, by the UE in the connected state, the configuration strategy transmitted by the base station comprises:
receiving, by the UE, the configuration strategy via a connection setup command in a connection setup procedure with the base station; or receiving, by the UE, the configuration strategy via a connection reconfiguration command; or receiving, by the UE, the configuration strategy via handover signaling in a handover procedure.

8. A method for switching a state of a User Equipment (UE), the method comprising:

configuring, by a base station, the UE with a configuration strategy for the UE to enter an inactive state on its own initiative; wherein the configuration strategy is a judgment rule for the UE to enter an inactive state; and transmitting, by the base station, the configuration strategy to the UE;

wherein the inactive state is a state in which the UE remains connected with a core network, but the UE does not perform any conventional operations in an air-interface connected state and is not allocated with any UE identifier to be directly used for air-interface transmission;

wherein the configuration strategy comprises an intra-area unique identifier of the UE in the inactive state;

wherein the intra-area unique identifier of the UE in the inactive state is different from an International Mobile Subscriber Identity (IMSI) and a Cell-Radio Network Temporary Identifier (C-RNTI).

9. The method according to claim 8, wherein the configuration strategy further comprises at least one of an indication that the UE is allowed to enter the inactive state, or a first timer for the UE to enter the inactive state.

10. The method according to claim 8, wherein transmitting, by the base station, the configuration strategy to the UE comprises:

transmitting, by the base station, the configuration strategy via a connection setup command in a connection setup procedure; or transmitting, by the base station, the configuration strategy via a connection reconfiguration command; or transmitting, by the base station, the configuration strategy via handover signaling in a UE handover procedure.

11. The method according to claim 8, wherein after the base station transmits the configuration strategy to the UE, the method further comprises:

determining, by the base station, that the UE enters the inactive state from a connected state, according to the configuration strategy; and storing, by the base station, a UE context before the UE enters the inactive state, and releasing an air-interface unique identifier for the UE to transmit data in the connected state.

12. The method according to claim 11, wherein determining, by the base station, that the UE enters the inactive state from the connected state comprises:

starting, by the base station, a first timer for the UE to enter the inactive state, upon determining that there is no subsequent uplink data transmission and downlink data transmission of the UE; and determining, by the base station, whether there is subsequent uplink and downlink data transmission, at each subsequent timing unit, and if there is no subsequent uplink and downlink data transmission, then incrementing the first timer by one at each timing unit until the first timer expires, wherein the timing unit is a Transmission Time Interval (TTI), a sub-frame, or a preset absolute period of time; or if the base station determines that there is uplink data transmission and/or downlink data transmission at a subsequent timing unit, then stopping the first timer; and determining, by the base station, that the UE enters the inactive state from the connected state, upon determining that the first timer expires.

13. The method according to claim 12, wherein determining, by the base station, that there is no subsequent uplink data transmission of the UE comprises:

determining, by the base station, that there is no subsequent uplink data transmission of the UE, upon reception of an indication reported by the UE to indicate that an uplink buffer of the UE is empty; or starting, by the base station, a second timer upon determining that a last uplink data packet is received, according to a buffer reported by the UE, and determining that there is no subsequent uplink data transmission of the UE, if no uplink data transmission is received when the second timer expires; or determining, by the base station, that there is no subsequent uplink data transmission of the UE, upon reception of a trigger instruction reported by the UE to indicate that uplink traffic is completed, or uplink traffic is terminated; and determining, by the base station, that there is no subsequent downlink data transmission of the UE comprises:

determining, by the base station, that there is no subsequent downlink data transmission of the UE, upon determining that a downlink data buffer of the UE is empty; or determining, by the base station, that there is no subsequent downlink data transmission of the UE, upon reception of a trigger instruction indicating that downlink traffic of the UE is completed, or downlink traffic of the UE is terminated.

14. The method according to claim 11, wherein determining, by the base station, that the UE enters the inactive state from the connected state comprises:

determining, by the base station, that the UE enters the inactive state from the connected state, upon reception of a request transmitted by a target base station to obtain a context of the UE, wherein the target base station is a base station receiving a connection resumption request or a data transmission request, transmitted by the UE and comprising an intra-area unique identifier of the UE in the inactive state; or determining, by the base station, that the UE enters the inactive state from the connected state, upon reception of a connection resumption request or a data transmission request, transmitted by the UE and comprising an intra-area unique identifier of the UE in the inactive state.

15. An apparatus for switching a state of a User Equipment (UE), the apparatus comprising at least one processor and a memory; wherein the memory is configured to store readable program codes, and the at least one processor is configured to execute the readable program codes to:

receive a configuration strategy transmitted by a base station on the UE in a connected state, wherein the configuration strategy is a judgment rule for the UE to enter an inactive state; and control the UE to enter the inactive state from the connected state on its own initiative according to the configuration strategy, when a condition for the UE to enter the inactive state is met;

wherein the inactive state is a state in which the UE remains connected with a core network, but the UE does not perform any conventional operations in an air-interface connected state and is not allocated with any UE identifier to be directly used for air-interface transmission;

wherein the configuration strategy comprises at least one of an intra-area unique identifier of the UE in the inactive state;

wherein the intra-area unique identifier of the UE in the inactive state is different from an International Mobile Subscriber Identity (IMSI) and a Cell-Radio Network Temporary Identifier C-RNTI.

16. The apparatus according to claim 15, wherein the configuration strategy further comprises at least one of an indication that the UE is allowed to enter the inactive state, or a first timer for the UE to enter the inactive state.

17. The apparatus according to claim 15, wherein when the configuration strategy comprises the first timer for the UE to enter the inactive state, the at least one processor is further configured to execute the readable program codes to control the UE to enter the inactive state from the connected state according to the configuration strategy by:

determining whether there is subsequent uplink data transmission and downlink data transmission, and if there is no subsequent uplink data transmission and downlink data transmission, starting the first timer; and determining whether there is subsequent uplink and downlink data transmission, at each subsequent timing unit, and if there is no subsequent uplink and downlink data transmission, incrementing the first timer by one at each timing unit until the first timer expires, wherein the timing unit is a Transmission Time Interval (TTI), a sub-frame, or a preset absolute period of time; or if it is determined that there is uplink data transmission and/or downlink data transmission at a subsequent timing unit, stopping the first timer; and controlling the UE to enter the inactive state from the connected state, upon determining that the first timer expires.

18. The apparatus according to claim 17, wherein the at least one processor is further configured to execute the readable program codes to determine that there is no subsequent uplink data transmission by:

determining that there is no subsequent uplink data transmission, upon determining that an uplink data buffer is empty; or determining that there is no subsequent uplink data transmission, upon reception of a trigger instruction indicating that uplink traffic is completed, or uplink traffic is terminated; and the processing unit is configured to determine that there is no subsequent downlink data transmission by:

determining that there is no subsequent downlink data transmission, upon reception of an indication transmitted by the base station to indicate a last downlink data packet; or determining that there is no subsequent downlink data transmission, if no downlink data transmission is received when a second timer expires, wherein the second timer is started after the UE receives downlink data transmission of the base station.

19. The apparatus according to claim 15, wherein the at least one processor is further configured to execute the readable program codes to:

transmit a connection resumption request to the base station after the UE is controlled to enter the inactive state from the connected state according to the configuration strategy, wherein the connection resumption request carries an intra-area unique identifier of the UE in the inactive state; and set up a connection between the UE and the base station, and control the UE to enter the connected state from the inactive state;

or, transmit a data transmission request to the base station after the UE is controlled to enter the inactive state from the connected state according to the configuration strategy, wherein the data transmission request carries an intra-area unique identifier of the UE in the inactive state; and transmit data in the inactive state according to a UE context, transmitted by the base station and stored in the inactive state of the UE.

20. The apparatus according to claim 15, wherein the at least one processor is further configured to execute the readable program codes to receive the configuration strategy transmitted by the base station on the UE in the connected state by:

receiving the configuration strategy via a connection setup command in a connection setup procedure with the base station; or receiving the configuration strategy via a connection reconfiguration command; or receiving the configuration strategy via handover signaling in a handover procedure.

* * * * *